Oct. 19, 1954  E. SCHMUED ET AL  2,692,098
SHOCK-ABSORBING LANDING GEAR
Filed June 19, 1950  2 Sheets-Sheet 1

Edgar Schmued &
Duane C. Olmore
INVENTORS

BY James M. Clark

THEIR PATENT ATTORNEY

Oct. 19, 1954
E. SCHMUED ET AL
2,692,098
SHOCK-ABSORBING LANDING GEAR
Filed June 19, 1950
2 Sheets-Sheet 2
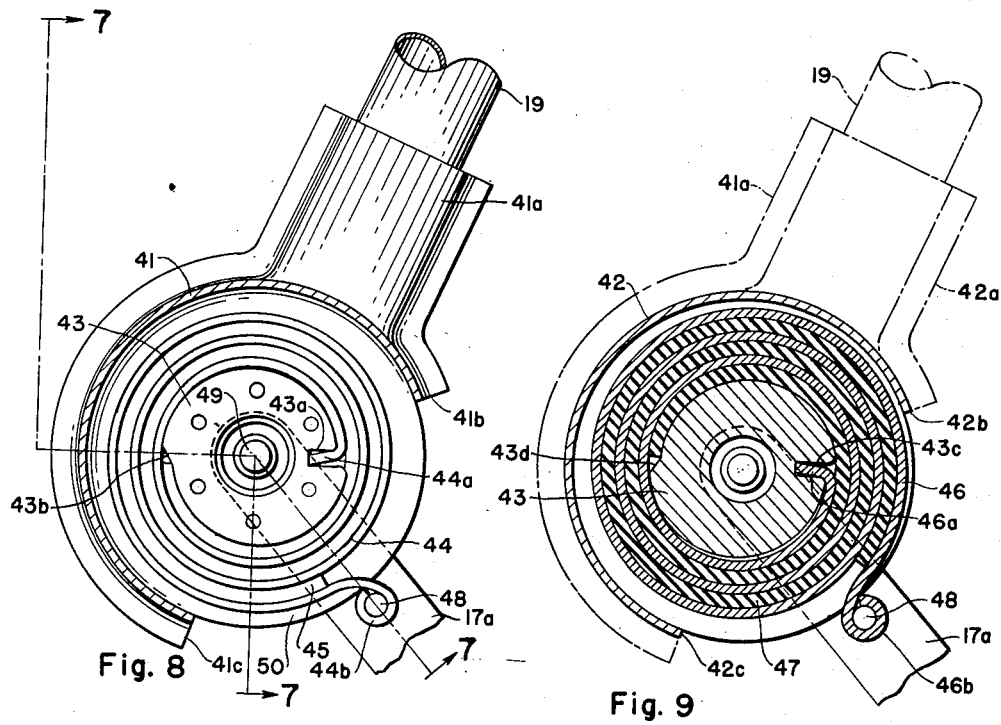
Fig. 8
Fig. 9
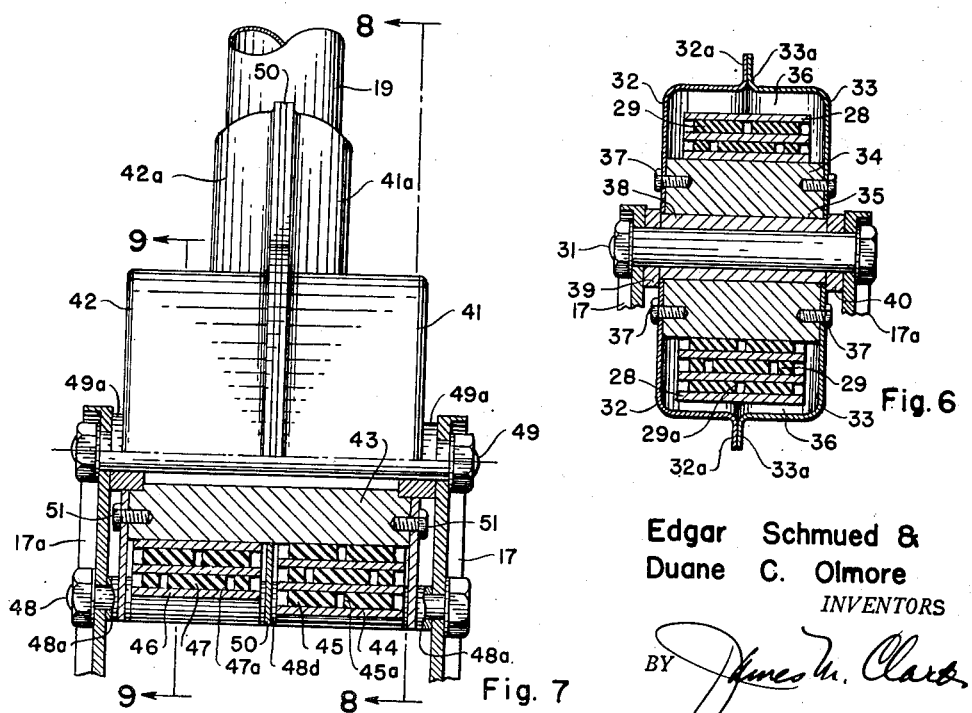
Fig. 7
Fig. 6
Edgar Schmued &
Duane C. Olmore
INVENTORS
BY James M. Clark
THEIR PATENT ATTORNEY Patented Oct. 19, 1954

2,692,098

UNITED STATES PATENT OFFICE 2,692,098

SHOCK-ABSORBING LANDING GEAR

Edgar Schmued and Duane C. Olmore, Los Angeles, Calif., assignors to North American Aviation, Inc.

Application June 19, 1950, Serial No. 169,046

8 Claims. (Cl. 244—104)

The present invention relates generally to landing gears and more particularly to improvements in shock absorbing landing gear arrangements for aircraft and other vehicles.

The landing gears of aircraft and similar vehicles usually require suitable shock absorbing devices to absorb the impacts due to landing or to movement of the vehicle over the ground. Such shock absorbing devices, particularly in relatively small and light aircraft, are frequently both complicated and costly in construction and many efforts have been made to provide shock absorbing means of greater simplicity and lesser cost to construct. A large number of the shock absorbing devices utilized in light aircraft have been of the hydraulic and oleo-pneumatic type in which the shock absorber combines the resistance to displacement of a fluid within a suitable piston and cylinder arrangement, with the resilient opposition of an axially compressible coil spring. Shock absorbers of this type are relatively costly due to the necessity of accurate machining of the piston and cylinder to provide air or fluid-tight relationships and such shock absorbers have also been relatively heavy for the loads which they are required to sustain.

The present invention is directed to an improved and simplified shock absorbing arrangement comprising essentially a levered suspension ground-engaging member supported from a flat torsion spring wound in a spiral form with rubber or other elastic and resilient material placed in either a continuous or intermittent strip between the successive coils of the torsion spring. The torsion spring is preferably housed within a casing of stamped sheet metal contruction at the lower terminal of a cantilevered strut and the suspension lever is pivotally mounted for rotation about the central axis of the torsion spring while a portion intermediate its pivot and the wheel-carrying axle is engaged with the outer free end of the spring. Loading and deflection of the spring compresses the intervening elastic material which cushions the spring and absorbs a major portion of the load.

The present improved arrangement has exhibited exceptionally good shock absorbing qualities inasmuch as during landing the snubbing action increases rapidly due both to wind-up of the spring and shortening of the suspension lever arm. The present shock absorbing gear also returns slowly from its compressed to its extended position, which feature is particularly noticeable during taxiing over rough ground, and it has been found that the shock absorber is quick to load but is relatively slow to return to its initial position. The improved shock absorbing landing gear is particularly adapted for small and light aircraft and readily lends itself to light weight and economic construction, being adapted for stamped sheet metal construction with a minimum of machining as compared to prior type landing gears. The resilient units of the present invention are also of such nature that they readily lend themselves to multiple or plural use in the same landing gear to increase the load carrying capacity and two such units may be wound in opposite directions to provide a landing gear having equal snubbing action in both directions.

It is, accordingly, a major object of the present invention to provide an improved shock absorbing landing gear arrangement which is simple and economical in construction and relatively light in weight. It is a corollary objective to provide an improved shock absorbing landing gear for small and relatively light aircraft which is adapted for stamped sheet metal construction and requires a minimum of machining as compared to existing landing gears. It is a further object to provide a landing gear of the levered suspension type which utilizes a simple flat torsion spring wound in a spiral and which also utilizes rubber or other resilient material placed in either a continuous or intermittent strip between the successive coils of the spring for providing the desired shock absorbing characteristics. It is a further object to provide such a shock absorber which during landing exhibits a snubbing action which increases rapidly due both to the wind-up of the spring and the shortening of the arm of the lever. It is a still further object to provide a landing gear arrangement which derives improved shock absorbing qualities such that the landing gear returns from its compressed or loaded, to its extended position slowly, being quick to load and relatively slow to return, and exhibiting satisfactory qualities during taxiing over rough ground. A still further object resides in a resilient unit of the type which adapts itself to use in dual or multiple installations, either when wound in the same direction for increasing the load carrying capacity, or when wound in opposite directions for providing equal snubbing action in both directions. Further objects and advantages of the present invention reside more particularly in the specific details of the device as well as in the overall arrangement of the elements, and will become apparent to those skilled in the art after reading the present description, taken in conjunction with the accompanying drawings, in which:

Fig. 1 is an elevational view of an airplane to which the presently improved landing gear units have been applied;

Fig. 1A is a rear elevational view of one of the improved landing units;

Fig. 2 is an enlarged elevational view of the shock absorbing landing gear unit shown in Fig. 1A;

Fig. 3 is a still further enlarged cross-sectional elevation of the shock absorbing unit utilized in the landing device of Fig. 2;

Fig. 4 is a transverse cross-sectional view of the shock absorbing unit as taken along the lines 4—4 of Fig. 3;

Fig. 5 is a detail sectional elevation of the outer spring terminal attachment taken along the lines 5—5 of Fig. 3;

Fig. 5A is a fragmentary view of the perforated rubber lining element;

Fig. 6 is a transverse sectional elevation of a further modification of a shock absorbing unit of the type shown in Fig. 4 housed within a stamped sheet metal casing;

Fig. 7 is a front elevational view, partly in cross-section, of a further modified form of the present invention in which dual shock absorbing units are provided;

Fig. 8 is a sectional elevational view of the same as taken along the lines 8—8 of Fig. 7; and Fig. 9 is a similar sectional elevational view of the same as taken along the lines 9—9 of Fig. 7.

Referring now to Fig. 1, the numeral 10 designates an airplane having a fuselage 11, a cockpit 12 for its occupants and a pair of laterally extending sustaining surfaces or wings 13. The airplane 10 may preferably be provided with a suitable power plant within its nose portion driving the tractor propeller 14 for the propulsion of the airplane shown, although it will be understood that the improved shock absorbing landing gears of the present invention are equally adapted for use with other airplanes than the type which have been selected for illustration in the drawings.

The airplane shown in Fig. 1 is shown as provided with a ground-engaging nose wheel 15 and a pair of laterally and more rearwardly disposed main wheels 16 for the support of the airplane upon the ground and to facilitate its landing and take-off as well as taxiing along the ground. Each of the wheels 15 and 16 is indicated as being rotationally supported from the lower rearward extremities of the levered suspension forks or arms 17 which are resiliently supported from the shock absorbing units 20, the latter in turn being supported at the lower extremities of the cantilevered struts 18 and 19, from the nose portion and the wings of the airplane, respectively. The nose and main landing gear units selected for illustration in Fig. 1 are of the fixed type but it will be understood that the present invention is equally applicable to landing gears of the retractable type as well as to those arrangements in which the tail wheel is provided instead of a nose wheel, or in other arrangements of the landing gear units.

As more particularly shown in Fig. 2, the wheel 16 is rotatably carried at the lower aft terminal of the suspension lever arms 17 by means of the wheel axle 16a. The lever arms 17 are pivotally mounted for rotation about the axis of the resilient shock absorbing unit 20 which is housed within the casing 21 and has an upwardly and rearwardly extending socket portion 22 which engages the lower terminal of the cantilevered strut 19. The casing or housing 21 is provided with an end plate 24 attached by means of the screws 25 and the upper terminal of each of the lever arms 17 engage the pivot pin 31 and are intermediately provided with an interconnecting pin 30 which engages the outer terminal of the shock absorbing spring.

Referring now more particularly to Figs. 3, 4 and 5, the housing 21 for the resilient unit 20 is provided with a socket portion 22 for the strut 19 and is also centrally provided with a bored portion 23. The housing 21 is self-enclosed on its one side by its integral side wall construction and is provided at its opposite open side with the above mentioned cover plate 24 attached by means of the screws 25 engaging the tapped holes 25a in the periphery of the housing 21 and the similar holes 25b in the hub portion. The latter is also provided with an annular recess portion 26 for housing the torsion spring 28 and intermediate band 29, and a hub portion 27 is accordingly formed between the central bore 23 and the annular recess 26.

The torsion spring 28 is formed from suitable steel and satisfactory results in an actual installation have been obtained from SAE 109 steel heat treated to Rockwell "C" 50, the band stock being spirally wound clock-spring fashion with its inner terminal inwardly bent as at 28a, to be anchored within the recess 27a within the hub 27. As viewed in Fig. 3, the spring 28 is wound in the form of a spiral in the left hand or counterclockwise direction with slightly less than three complete convolutions in the manner of a relatively short clock spring motor. The outer terminal of the spring 28 terminates in a circularly bent portion such that it forms an eye 28b which is transversely engaged by the pin 30 extending between the two suspension arm halves 17 and 17a of the wheel fork assembly which they form. The axis of the pin 30 is accordingly horizontal and transverse to the fore and aft axis of the airplane, and is parallel to, below, and to the rear of the pivot axis of the pin 31. The housing 21 for the shock absorbing unit 20 has its exterior or peripheral portion opened up or removed between the radially extending faces 21a and 21b to provide an arcuate space within which the terminal 28b and the pin 30 may rotate about the axis of the pin 31 as the shock absorber is loaded or relieved of its load. As shown in Fig. 5, spacing collars 30b and 30c are provided about the pin 30 on each side of the centrally disposed spring 28 at its outer terminal 28b and the entire assembly is retained within the aligned openings in the suspension arms 17 and 17a by means of the locking nut 30a for the resiliently floating pin bolt 30. The casing 21 is recessed at 21c, and the cover plate 24 is similarly recessed at 24a to receive the spacing collars or bushings 31c and 31b, respectively, inside the fork arms 17 and 17a retained by the pin 31 and its nut 31a.

The torsion coil spring 28 is sufficiently open to permit the insertion therein of a snubbing material in the form of a band 29 having elastic or resilient qualities such as synthetic rubber forming nested or interleaved coils. This band or coil of synthetic material 29 also is wound in the counterclockwise or left hand direction as viewed in Fig. 3, with its inner terminal placed at the recess 27b provided for it within the hub portion 27 and with its outer terminal ending just short of the terminal 28b of the spring 28. It is desirable that the surface friction between the spring 28 and the resilient band 29 be reduced to a minimum as the spring is loaded and deflected in order that the coils cooperatively provide the proper snubbing characteristics. The resilient band 29 is, accordingly, perforated or provided throughout its length with a plurality of holes 29a, as shown in Fig. 5A, through its thickness and a lubricant of oil and graphite applied such that it fills the holes 29a and thinly coats the engaging surfaces of the resilient band. The American Vacuum lubrication compound No. 65 proved to be a satisfactory lubricant with a very thin coat applied on each side and the holes in the synthetic rubber member filled with this grease compound. In the event the resilient band is not provided with proper lubrication it gets very dry and will heat and gall due to friction, and under such conditions the rubber strip curls badly and becomes unworkable. When properly lubricated however it assumes much of the load of the spring unit and accordingly permits the latter to be made much lighter for a given load.

It will, accordingly, be seen that the disclosed arrangement provides a simplified shock absorbing assembly of unique design which while primarily intended for nose or tail wheel installation is also applicable to the main landing gear in either the single shock absorber unit described above or in the dual units to be described below. The arrangement shown in Figs. 1 to 5, inclusive, is particularly adaptable to small aircraft and readily lends itself to light weight construction. It will be noted by reference to Fig. 2, particularly, that the snubbing action during landing increases rapidly due both to wind-up of the spring and shortening of the lever arm. In Fig. 2, the shock absorber unit is shown in approximately the static position, and the fully extended position would provide a more vertical suspended attitude of the fork suspension arms 17 and 17a, and its fully compressed and loaded attitude would provide a more nearly horizontal disposition of the fork arms 17, as are shown in this figure. As a result of this arrangement, the landing gear exhibits good shock absorbing qualities in that the gear returns from the compressed to the extended position slowly, and is particularly adapted for taxiing on rough fields because it is quick to load and relatively slow to return.

In Fig. 6, there is shown a preferred form of the shock absorbing unit described above which is housed within a relatively light stamped sheet metal structure which entails a minimum of machining. The spring 28 and resilient interlining band 29 are otherwise identical with the corresponding and like numbered elements in the modification shown in Figs. 1 to 5A, inclusive, and the resilient unit is housed within the space 36 formed by the complementary casing halves 32 and 33 having upstanding flanges 32a and 33a to which they may be attached by suitable screws (not shown). A hub element 34 of annular shape having a central bore 35 has a sleeve 38 coaxially fitted therewithin, the sleeve 38 being also bored to accommodate the central pivot pin 31. The casing halves 32 and 33 are attached by the machine screws 37 engaging tapped holes within the hub portion 34 and spacing collars 39 and 40 are disposed at each end of the sleeves 38 between the fork arms 17 and 17a to properly space the latter for rotation about the axis of the central pin 31. The modification shown in Fig. 6 has all of the shock absorbing characteristics and features of the previous form of the invention but has the further advantage of simplicity, and low weight and cost due to the stamped and welded sheet construction described.

In certain installations it may be desirable that the snubbing action be equal or substantially so in both directions and a form of the device is disclosed in Figs. 7, 8 and 9, in which these characteristics are accomplished. In these figures, the casing or housing is made up of the two complementary halves 41 and 42 which are provided with upwardly and rearwardly extending socket portions 41a and 42a to receive the cantilever strut 19. A central hub portion 43 of annular shape is centrally and axially retained between the casing halves 41 and 42 and is suitably formed and notched as at 43a, 43b, 43c and 43d to accommodate two sets of resilient spring and interlining elements. A first of these resilient units of counterclockwise form (from the center outwardly) is comprised of the steel spring 44 and the resilient band element 45, as shown in the elevational view in Fig. 8, and the second unit of clockwise form is comprised of the steel spring 46 and the resilient band material 47, as shown in the cross-section in Fig. 9. The hub member 43 is notched, as indicated above, as at 43a to receive the offset inner terminal 44a of the resilient spring 44 and the other half of the hub element 43 is similarly notched as at 43c to accommodate the inner terminal 46a of the steel spring 46. Similarly, the hub 43 is recessed and shaped as at 43b to accommodate the resilient band 45 on the one half of the assembly and is formed in the opposite direction as at 43d on its other half to receive the oppositely wound resilient band 47. An outer terminal pin 48 extends between the fork or frame arms 17 and 17a with suitable spacers or bushings 48a disposed at each end, and the outer terminals of the steel springs, as they are wound in opposite directions, are formed with eye portions, 44b and 46b, respectively, to be engaged by the transversely extending floating pin 48.

A central pivot pin 49 extends transversely through the bore of the hub portion 43 with suitable spacing collars 49a between the outer faces of the casing halves 41 and 42 and the wheel fork arms 17 and 17a. The casing halves are preferably provided with a central intermediately disposed dividing plate 50 which is clamped between the casing halves 41 and 42, the walls of which are fastened to the central hub element 43 by means of the machine screws 51 engaging suitable tapped holes therein. As in the case of the previous modifications, the outer casing halves are interrupted peripherally to terminate in the end portions 41b, 42b, 41c and 42c, somewhat beyond the limits of arcuate movement of the floating pin 48 and the spring terminals 44b and 46b. The elastic coils 45 and 47 are similarly provided with perforations or holes 45a and 47a for the retention of the lubricant as described above. It will accordingly be noted that with the use of the two spring units in the assembly shown in Figs. 7 to 9, inclusive, in which the spring units are wound oppositely with respect to the other, the snubbing action will be equal in both directions.

It will be also apparent that where equal snubbing action is not required in both directions, but where a larger shock absorber of greater load capacity may be desirable, such a shock absorber is readily constructed of two resilient units wound in the same direction and housed within a dual casing of the type described in connection with the modification of Figs. 7 to 9, inclusive. It should be noted that there is an important difference in the operation of the present device depending upon whether rubber or synthetic rubber, and other resilient materials such as "neoprene" or other synthetics are used. It has been found by actual test that rubber does not perform satisfactorily from the standpoint of the snubbing action desired. This results from the tendency of rubber to return quickly and to a nearly equal extent after loading. "Neoprene" on the other hand was found to be most suitable, exhibiting a certain hysteresis or lag in returning to its original position when the load is released. Other synthetics, it was found, did not return completely and were objectionable for this reason. Accordingly, the use of the word "rubber" in the present specification and in the claims is intended to include "neoprene" and such other synthetics which have similar and suitable properties.

Other forms and modifications of the present invention both with respect to its general arrangement and the details of its respective parts will become apparent to those skilled in the art after reading the present description and are intended to come within the scope and spirit of the present invention as more particularly set forth in the appended claims.

We claim:

1. In aircraft, the combination with a wheel-carrying element pivotally mounted upon the aircraft, of resilient means including a pair of oppositely wound flat coil springs anchored at their centers to the aircraft and pivotally engaged at their outer extremities to said wheel-carrying element, one of said springs coiled in the clockwise direction from its center outward, the other said spring coiled in the counterclockwise direction from its center outward for providing resilient absorption and snubbing of wheel shocks in both directions, and a flat synthetic rubber element having high hysteresis characteristics disposed within the coils of said flat coil springs and having their flat faces in contact therewith, the surfaces of said synthetic rubber element having recesses filled with a lubricant for preventing excessive heating due to friction as said coil springs slidingly compress said synthetic rubber element as said coil springs are subjected to external loads.

2. In running gear construction, a vehicle, a wheel-carrying suspension lever means pivotally mounted for limited rotation upon said vehicle, resilient means including a pair of oppositely wound laterally disposed flat coil torsion springs anchored at their centers to said vehicle and engaging said suspension lever means at their outer extremities, and a flat synthetic rubber element disposed within the coils of each of said torsion springs and having its flat faces in contact therewith, the surfaces of said synthetic rubber element having recesses filled with a lubricant such that pivotal movements of said suspension lever means about said pivotal mounting in either direction is resiliently opposed by coiling of one spring and uncoiling of the other and excessive heating due to friction is prevented as said torsion springs slidingly compress said rubber element as said wheel-carrying suspension lever means is subjected to external load.

3. In shock-absorbing construction, a relatively fixed tubular strut, a flat coil torsion spring having inner and outer terminals, a flat rubber element disposed within the coils of said torsion spring and having its flat faces in contact therewith, a two-part stamped sheet metal housing, each housing part having cylindrical portions enclosing said torsion spring, each housing part having a radially extending portion engaging said tubular strut, hub means extending axially across said two-part housing, and wheel suspension lever means pivotally mounted for limited rotation about said fixed hub means, the inner terminal of said torsion spring anchored to said hub means and the outer terminal anchored to said lever means arranged such that rotation of said lever means about said pivotal mounting is resiliently opposed by said torsion spring and said flat rubber element while completely enclosed within said two-part housing, the surfaces of said flat rubber element having recesses filled with a lubricant for preventing excessive heating due to friction as said torsion spring slidingly compresses said flat rubber element as said outer terminal of said wheel suspension means is subjected to external load.

4. Shock-absorber construction including a cantilevered strut, wheel-carrying means pivotally mounted upon said strut, a laminated torsion spring of steel and a flat synthetic rubber element having high hysteresis lag, said steel spring having an inner terminal anchored to said strut and having its outer terminal attached to said wheel-carrying means arranged with said synthetic rubber element to resiliently oppose pivotal rotation of said wheel-carrying means by the torsional winding of said spring and its sliding compression of said synthetic rubber element, the surfaces of said flat synthetic element having recesses filled with a lubricant for preventing excessive heating due to friction caused by the said sliding compression of said synthetic rubber element.

5. Shock-absorber construction comprising a cantilevered strut, a hub assembly carried by said strut, elongated wheel-carrying means including a pair of lever elements pivotally mounted at a first terminal portion upon said hub assembly, said means operatively carrying a wheel at an opposite terminal portion, a laminated torsion spring of flat steel and a flat synthetic rubber element having high hysteresis lag, said steel spring having an inner terminal anchored to said hub assembly and having an outer terminal attached to an intermediate portion of said wheel-carrying means, said torsion spring arranged to resiliently oppose pivotal rotation of said wheel-carrying means by the torsional winding of said spring about said hub assembly and the sliding compression of said synthetic rubber element, the return from said pivotal rotation being damped by the lag in return of said synthetic rubber element, the surfaces of said synthetic rubber element having recesses filled with a lubricant for preventing excessive heating due to friction as said torsion spring slidingly compresses said synthetic rubber element.

6. In laminated spring construction, a central supporting element, a torsion coil spring of flat metallic material having its inner terminal anchored to said central element and having an outer terminal, a flat synthetic rubber element having high hysteresis lag characteristics disposed within the coils of said torsion spring and having its flat faces in contact therewith, the surfaces of said synthetic rubber element having recesses filled with a lubricant for preventing excessive heating due to friction as said metallic spring slidingly compresses said synthetic rubber element as said outer terminal of said metallic spring is subjected to external loads.

7. A vehicle, a wheel-carrying element pivotally mounted upon said vehicle, resilient means including a flat torsion spring interposed between said vehicle and said wheel-carrying element for providing resilient absorption of shocks to which said vehicle or said wheel-carrying element may be subjected, a flat rubber element having high hysteresis lag characteristics coiled within said torsion spring for damping said resilient shock absorption in returning slowly to its original position when the shock has been dissipated, and recesses formed in one of the flat surfaces of said rubber element filled with a lubricant for preventing excessive heating due to friction generated during absorption of shocks.

8. A vehicle, a wheel-carrying suspension lever means pivotally mounted upon said vehicle for limited rotation, and resilient means including a flat metallic torsion spring having an interleaved synthetic rubber element coiled therewithin interposed between said vehicle and said suspension lever means for resiliently opposing pivotal movement of said suspension lever means about said pivotal mounting, the surfaces of said synthetic rubber element having recesses filled with a lubricant for preventing excessive heating due to friction as said metallic torsion spring slidingly compresses said rubber element as said torsion spring is subjected to external loads, said synthetic rubber element having a hysteresis lag in returning to its original condition for snubbing the return of said metallic torsion spring.

References Cited in the file of this patent

UNITED STATES PATENTS

| Number | Name | Date |
|---|---|---|
| 262,973 | Nilson | Aug. 22, 1882 |
| 1,099,646 | Gresser | June 9, 1914 |
| 1,376,912 | Ajello | May 3, 1921 |
| 2,176,971 | Klotsch | Oct. 24, 1939 |
| 2,231,037 | Taylor | Feb. 11, 1941 |
| 2,515,704 | Gardiner | July 18, 1950 |

FOREIGN PATENTS

| Number | Country | Date |
|---|---|---|
| 320,987 | Germany | May 8, 1920 |
| 858,815 | France | May 20, 1940 |